United States Patent [19]
Keenan et al.

[11] 3,745,821
[45] July 17, 1973

[54] TORQUE TO ELECTRICAL CURRENT TRANSDUCER

[75] Inventors: Charles E. Keenan, Perkasie; William A. Power, Willow Grove, both of Pa.

[73] Assignee: Ametek, Inc., New York, N.Y.

[22] Filed: Sept. 30, 1970

[21] Appl. No.: 76,881

[52] U.S. Cl. .......... 73/141 R, 73/398 R, 250/231 R
[51] Int. Cl. .............................................. G01l 1/08
[58] Field of Search ...................... 73/517 B, 141 R, 73/398 R; 177/210, 212; 318/640, 641, 644, 645, 646, 651; 250/231 R

[56] References Cited
UNITED STATES PATENTS

| | | | |
|---|---|---|---|
| 2,498,997 | 2/1950 | McLean et al. .................... | 73/518 X |
| 2,734,735 | 2/1956 | Payne ............................. | 73/141 X R |
| 3,061,027 | 10/1962 | Berge et al. ..................... | 177/210 X |
| 3,066,255 | 11/1962 | Westphal ........................ | 73/382 X |
| 3,106,978 | 10/1963 | Cahn ............................. | 177/212 X |
| 3,295,378 | 1/1967 | Hirtreiter ........................ | 73/517 B |
| 3,512,027 | 5/1970 | Kupsky ........................ | 250/217 X SS |

OTHER PUBLICATIONS

Collins et al., "Torsion Vane Flowmeter for the Continuous Recording of Air Flow," J. Sci. Instrum., 1962, Vol. 39, pp. 115–118.

*Primary Examiner*—Charles A. Ruehl
*Attorney*—Smythe & Moore

[57] ABSTRACT

An electrical current transducer or transmitter having a meter movement with magnet means movable both by input torque directly to its shaft and by feedback current through stationary coils adjacent to the magnet, a vane mounted on the movement controlling radiant energy, and an energy sensitive means to produce a current level proportional to input displacement of the meter movement. The transducer comprises the output means of several electrical transmitters whose input means proportions the measured condition to torque for actuation of the transducer.

6 Claims, 7 Drawing Figures

PATENTED JUL 17 1973

INVENTORS
CHARLES E. KEENAN
WILLIAM A. POWER
BY
Smythe & Moore
ATTORNEYS

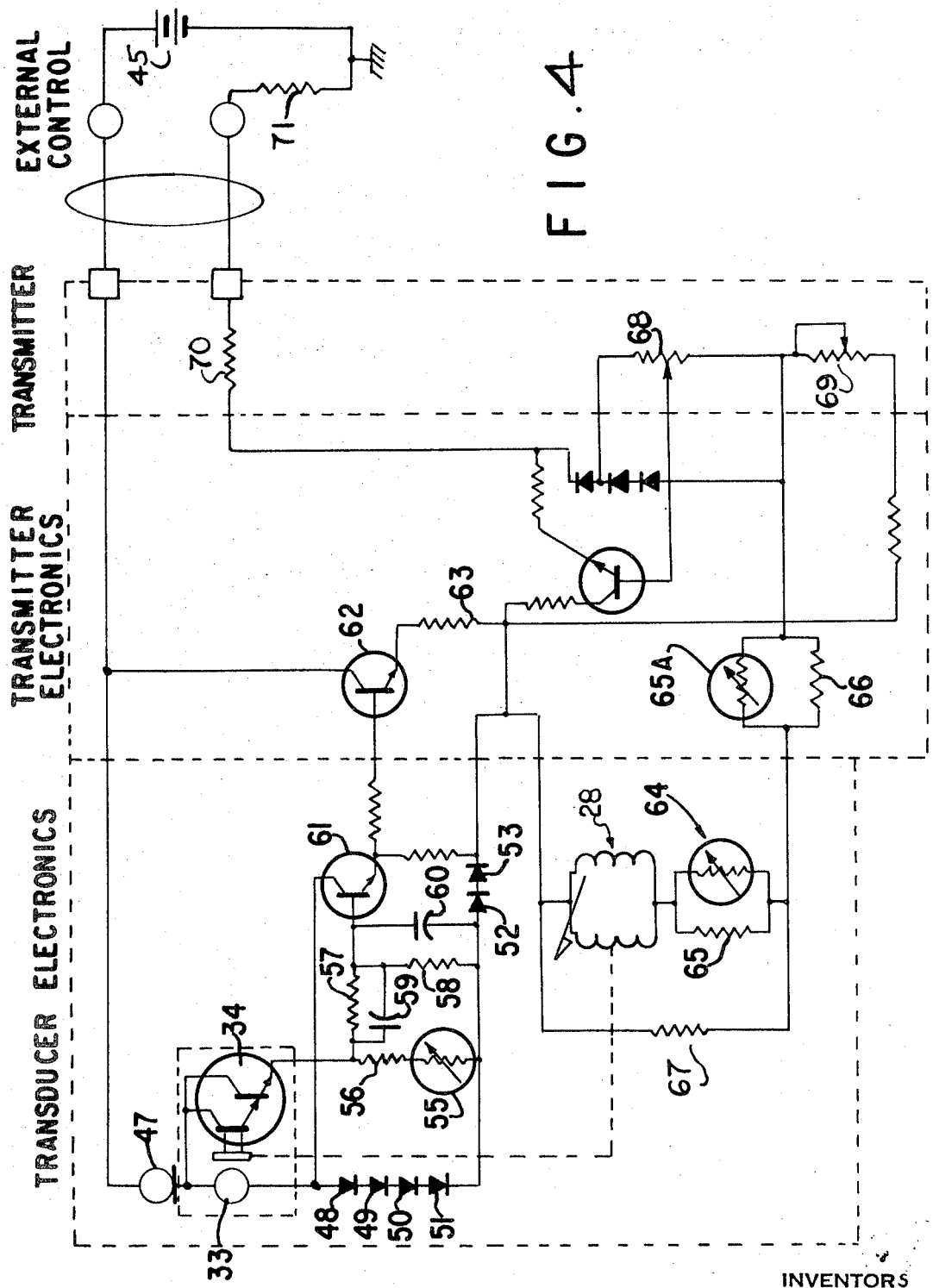

TORQUE TO ELECTRICAL CURRENT TRANSDUCER

The present invention relates to a transducer for converting torque to electrical current.

Many instruments have been devised for the sensing and measuring of various conditions in the fields of control and instrumentation. These include pressure, temperature, fluid flow, etc. A common form of such an instrument used for pressure comprises a pressure sensing or responsive unit which is operatively connected through a suitable mechanical movement to a calibrated indicator, such as a pointer movable over a scale. In an effort to increase the versatility of such pressure measuring instruments, electrically operable movements were provided, usually of the electromechanical type, which became thereby responsive to the sensed pressure.

In effect, such instruments are transducers in that pressure is converted into an electrical quantity. Such transducers were then constructed utilizing voltage transmission wherein a potentiometer was used across which the signal was impressed. However, such a pressure to voltage transducer had several disadvantages since it was necessary to compensate for the lead length. Also, temperature changes affect accuracy of the result. In addition, the signal produced from the potentiometer was of little value unless additional amplification was available.

Another group of transmitters was then developed utilizing the force balance principle in which force developed by the input element, for example, diaphragm or bellows capsule for pressure, is counter-balanced by force from an electro-magnet element excited by the output current passing through its coils. A detector was used to amplify motion resulting from force unbalance and, through an amplifier, to change the output current level until the input and feedback forces and, therefore, input condition and output signal current were equivalent. Such force balance transmitters provided an accurate and stable output current representation of the input independent of lead length, supply variations, and temperature changes and had a useable level of output current. Moreover, many employed displacement detector devices of low enough energy requirement that they could operate on the current and voltage levels lower than the minimum signal levels required of the circuit and so as to permit transmission of both power and output signal over the same set of two wires to a remotely located control room. Such transmitters are referred to as "two-wire" transmitters. One disadvantage of the original "two-wire" transmitters was that the energy levels required of the electro-mechanical feedback means was too high for safe operation in many hazardous areas without special housings. Such is true since the input force must be of a sufficiently high level to override the inaccuracies of the primary sensor, such as friction and spring rate of a diaphragm capsule, which would require a high feedback force with resultant energy level of the electro-mechanical feedback device and a beam system for mechanical advantage. The heavy structure of electro-mechanical feedback means and beam systems were also subject to inaccuracy and damage due to shock and vibration. Further, the response time of the instrument was limited by the mass and damping required.

One of the objects of the present invention is to provide a transducer which, when attached to input conditioned devices of good accuracy and stability, will provide improved pressure, temperature, fluid flow, and the like transmitters.

Another of the objects of the invention is to provide measuring instruments wherein the sensed condition is converted to an electrical current.

Another object of the invention is to provide "two-wire" operable transmitters which will operate at low energy levels.

A still further object of the invention is to provide an arrangement which can be used in hazardous areas.

In one aspect of the invention, there is provided a force balance torque-to-current transducer which includes a movable magnet meter having a pivotably mounted magnet means and a means of torque input to the movable magnet means. The input means can be either (1) a coil spring which when displaced at one end will introduce torque to the meter movement, (2) a "fan" blade inserted into a fluid stream and attached by arm to the meter movement to generate torque due to fluid flow, (3) a mass on an arm attached to the meter movement which will generate torque proportional to acceleration, etc. The input end of the hairspring of (1) can be connected to a pressure sensitive Bourdon tube, a filled temperature system or other system which converts the condition being measured to displacement of one end of the coil spring and, thereby, to torque input to the meter movement. A vane or radiant beam modulator is mounted on the pivotable or movable magnet means and extends into a radiant energy beam projected by a light emitting diode or by some other source, such as a light bulb, onto the sensitive surface of a suitable radiant energy responsive means. Output current of the responsive means is amplified to a suitable output signal level by an amplification means. The stationary coils of the meter movement have a proportional part of the output current passing through them to provide feedback bucking torque.

As an input torque is applied to the meter movement, the moving or pivotable magnet means will then rotate and the moving of the magnet means will, in turn, move the radiant beam modulator vane. The radiant beam energy impinging upon the radiant energy detector will generate a current which will flow through the stationary coil means to produce a torque opposing the torque exerted by the input means. The generated current can be indicated upon a milliameter or similar device which can be calibrated in values of the input condition, which provides the input torque, to give a direct reading of the sensed input condition.

These and other objects, advantages and features of the invention will become apparent from the following description and drawings, which are merely exemplarly.

In the drawings:

FIG. 4 is a wiring diagram; and

Figure 1:
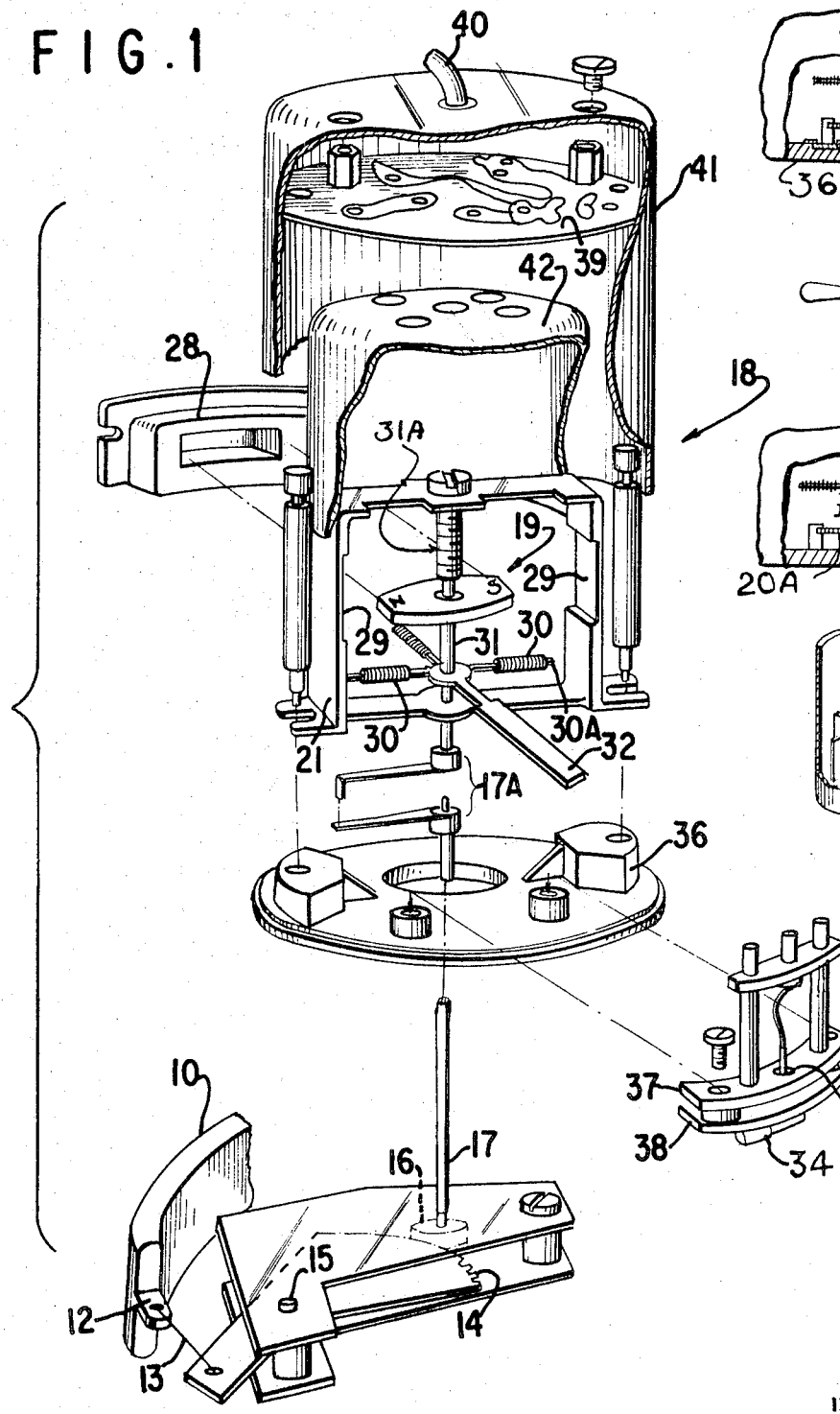
FIG. 1 is an exploded perspective view of one form of the invention.

As may be seen in FIG. 1, there is illustrated a movable magnet means movement indicated generally at 18 and comprising a movable magnet means 19 pivoted in meter frame 21. Meter movement coils 28 are held in the frame 21 at 29 and output circuit board 39 plugs thereto through meter shield 42 for electrical connection.

Figure 2:
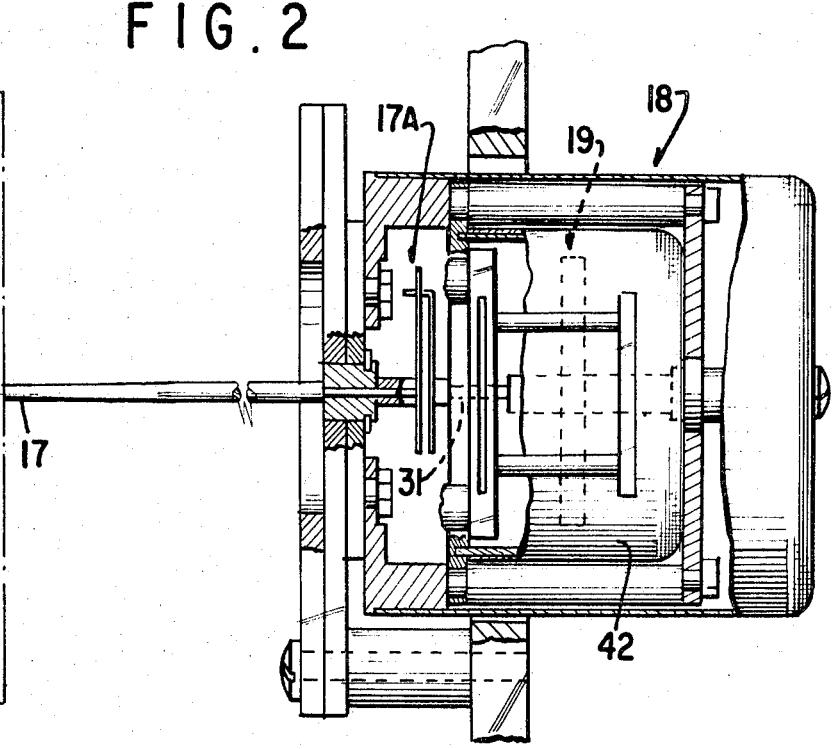
FIG. 2 is an assembly partially in section of the device of FIG. 1.

In the form shown in FIGS. 1 and 2, Bourdon tube 10 can have one end fixed (not shown) and the other end 12 movable and connected through linkage 13 to sector gear 14 pivotally mounted at 15. Sector gear 14 meshes with pinion gear 16 mounted on shaft 17. Shaft 17 is connected through intermediate connections 17A to shaft 31 such as the hairspring shown in FIG. 3. Shaft 31 is carried by adjustable bushing 31A, a high viscosity damping fluid or grease being used between the shaft and bushing. As previously mentioned, other types of condition responsive means can be used and connected to the input shaft 31.

Figure 3:
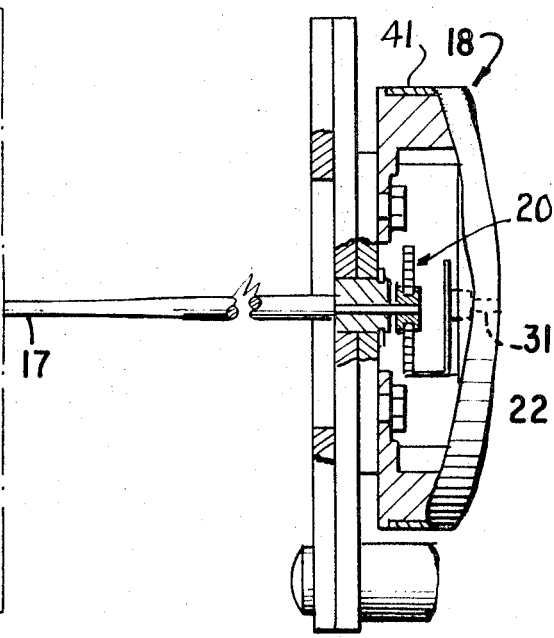
FIG. 3 is a fragmentary assembly of a modification of FIG. 2.

In the form of FIG. 3, a hairspring 20 (FIG. 3) can have one end thereof connected to input shaft 17 and the other to input shaft 31, the applied torque being transmitted therethrough.

Counterweights 30 for static balancing may be adjustably mounted on elements 30A connected to shaft 31 which carries permanent magnet means 19.

A vane or radiant energy modulating means 32 is mounted on the shaft 31 and extends outwardly therefrom to move between radiant energy source 33 and radiant energy detecting means 34. The source 33 and detector 34 are carried by frame 35 mounted on subframe 36. Vane 32 moves in the slot between members 37 and 38 of sub-frame 35.

Printed circuit board 39 may have the various connections and elements placed thereon for interconnecting the amplification components in the transducer and, through cable 40, with the power supply and control room.

Dust cover 41 is used to enclose the instrument and shield its operating parts from dust and light.

Light emitting diode 33 may, for example, be a gallium arsenide emitting diode with an emission in the range of 9,000 angstroms or near infra-red band such as RCA 40598A which has been found to be efficaceous in the present system. The diode is a square wafer edge-emitting type whose energy from all four edges is "collimated" into a parallel beam by a parabolic reflector.

The detector 34 can be a General Electric transistor detector 2N5777. The detector in the form shown is a photo-Darlington detector transistor. The radiation flux density with all available transmitter current, less than 4 milliamperes, passing through the diode is sufficient at the target of the photo-Darlington detector transistor when 0.1 inch away to produce at least 0.05 milliamperes output of the detector. Such a minimum signal current will develop enough voltage across a series emitter transistor to drive the output stage full scale through an intermediate stage of current amplification. The emitter and detector are small in size which will permit a compact assembly 35 to fit in a 0.16 inch space between the metal shield 42 of the meter and cover 41.

The all d.c. electronic circuit has no voltage gain so no low frequency breaks are present to effect dynamic stability. Furthermore, since the break frequency of the detector transistor 34 is above 40 Hz, the stability of the closed loop system can be maintained.

Current limiting diode 47 (FIG. 4), which can be an FET with gate to source short, is connected in series with the detector. The detector circuitry is d.c. so that no oscillator is required. Its operation on less than 4 volts and 3 mA contributes to stability and reliability due to low power dissipation. Most of the current limiter output passes through a series circuit of the light emitting diode 33 and six stabistor diodes 48 to 53, inclusive, the stabistors providing bias levels for the detector circuit.

The IR detector transistor 34 with series emitter components, thermistor 55 and resistor 56, is connected across the light emitting diode together with stabistors 48 to 51, inclusive, to give this stage 3.6 volts of operating bias.

The current output of the detector transistor, dropped across the series emitter network of thermistor 55 and resistor 56 which stabilizes its thermal characteristic, is applied as a voltage to a lead-leg network. This network consists of two 30 kilohm resistors 57, 58 connected in series, one with 0.22 uf capacitor 59 across it and the other with 10 uf capacitor 60 to provide time constants required for dynamic stability. Output of this network at the junction of the two RC parallel combinations connects to an emitter-follower stage at base of transistor 61 which prevents loading of the dynamic compensation network by the low input impedance of the output stage transistor 62 and limiting resistor 63.

Stabistors 52, 53 are introduced into the common lead between the detector transistor and the following stages because otherwise a significant part of the detector vane travel would be used in overcoming the base-emitter biases of transistors 61 and 62. The thermistor resistor parallel networks 64, 65 and 65A, 66 compensate for thermal coefficient of the torque motor coil resistance and for input element thermal coefficient, respectively. The value of resistor 67 is selected to provide identical torque/current characteristics for each transducer when more than one is used.

When the transducer is applied to a process control transmitter, span and zero adjustment circuits are connected in parallel across the feedback coils 28 (FIG. 1). The coils will operate on both the same minimum current supplied the light emitting diode and detector transistor and the voltage drop across the meter coils 28 so as not to further narrow the limits of circuit operation (e.g., less than 12 volts at full output, less than 4 mA at low output). The span adjustment is an adjustable resistor, and the zero circuit is an adjustable current source. The adjustment potentiometers 68, 69, test point jacks and resistor 70, and terminal connections can be mounted on a separate chassis with easy access from outside the transmitter.

Summarizing, the transducer circuit has the necessary characteristics for low level, two-wire operation. It requires a minimum of components, sufficient loop gain being available without electronic voltage amplification, and is all d.c. with low voltage and current levels on all critical components. The output stage components 62 and 63 could be mounted inside the transducer case without enlarging the case significantly, to provide a complete torque-to-current device in a single cylindrical package.

The transmitter with torque-to-current transducer output acts as a variable current source wherein the output current is a function of the process variable or condition to be indicated or controlled. Transmitter, power supply 45 and load 71 can be located remotely from each other. The limit of distance for useful operation involves values of supply voltage, transmitter drop (e.g., 10 to 12 volts at full output), load resistance, and total resistance of the interconnecting wires. Other values being fixed, line resistance is the limiting factor in remote operation.

Figure 5:
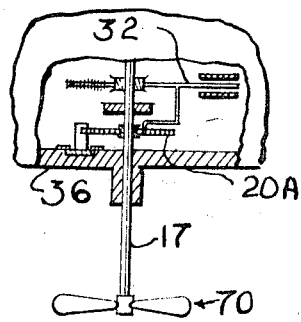
FIGS. 5, 6 and 7 illustrate inputs of different types.

The input could be a "fan" blade 70 (FIG. 5) coupled directly to movement shaft 31 and subjected to fluid flow. The spring 20A connected from input shaft 17 to sub-base 36 helps to provide dynamic stability.

Figure 6:
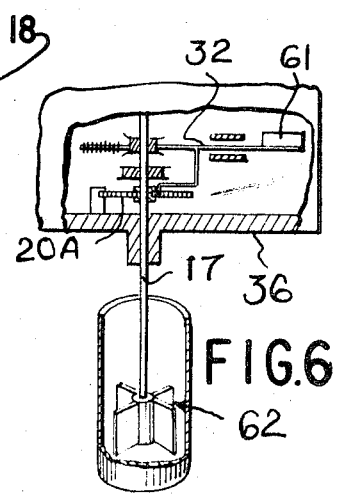

Another type of input is seen in FIG. 6 wherein vane 32 has a weight or unbalanced mass 61 which is subjected to acceleration forces so as to indicate the same. Dash pot 62 can be filled with damping fluid to damp the seismic system. Spring 20A from input shaft 17 to sub-base 36 completes the seismic system.

Figure 7:
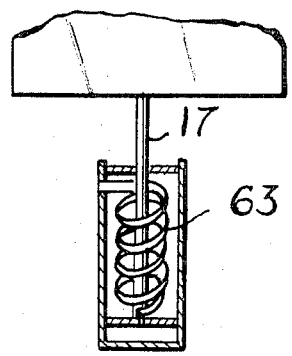

In a still further form of input, bimetallic helix 63 (FIG. 7) can be employed.

It should be apparent that details of construction and arrangement of parts can be varied without departing from the spirit of the invention except as defined in the appended claims.

What is claimed is:

1. In a torque to electrical current transducer, the combination of radiant energy detector means, current amplification means for increasing the detector output to a useable output current signal, radiant energy producing means for projecting a radiant energy beam onto said detector means, pivotably mounted magnet means, means for introducing input torque to said magnet means through a rotary compliant means, said compliant means having spaced portions connected to said magnet means and said means for introducing input torque, the displacement of the portion of said compliant means connected to said means for introducing input torque from a first position, changing the reference point defined by said first position and from which the input torque can be balanced, radiant energy modulating vane means carried by said magnet means and extendable into said radiant energy beam to produce an output signal upon change of input torque, stationary coil means adjacent said magnet means, and means for connecting said output signal to said coil means to provide a feedback torque to said magnet means.

2. A torque to electrical current transducer as claimed in claim 1 wherein said means for producing radiant energy is a radiant energy producing semiconductor.

3. In a torque to electrical current transducer, the combination including a d.c. source; radiant energy producing means connected across said source; radiant energy detector means responsive to said radiant energy producing means; input torque means; amplifier means, meter movement coil means and magnet means movable relative to each other by said input torque means, said radiant energy detector means and amplifier means being connected to said d.c. source, said energy producing means, detector means, and amplifier means drawing a predetermined signal current from said d.c. source when said detector means is not energized by said energy producing means, movement of said meter movement coil means and magnet means relative to each other in response to an input torque causing said detector means to be energized by said energy producing means, so as to produce an additional current from said d.c. source which is added to said predetermined current; and means connecting said meter movement coil means to the amplifier means to produce a feedback torque.

4. A torque to electrical current transducer as claimed in claim 3 wherein the detector means and amplifier means are connected across said energy producing means.

5. A torque to electrical current transducer as claimed in claim 4 wherein the magnet means is moved by said input torque means and there is a radiant energy modulating vane means connected to said magnet means for controlling radiant energy to said detector means.

6. A torque to electrical current transducer as claimed in claim 3 wherein the radiant energy producing means is a radiant energy producing semiconductor means.

* * * * *